P. J. NAGLE.
EGG CARRIER.
APPLICATION FILED DEC. 13, 1909.

961,889.

Patented June 21, 1910.

WITNESSES:

INVENTOR:

UNITED STATES PATENT OFFICE.

PETER J. NAGLE, OF ROCHESTER, NEW YORK.

EGG-CARRIER.

961,889.  Specification of Letters Patent.  Patented June 21, 1910.

Application filed December 13, 1909. Serial No. 532,957.

*To all whom it may concern:*

Be it known that I, PETER J. NAGLE, a citizen of the United States, and resident of Rochester, in the county of Monroe and State of New York, have invented certain new and useful Improvements in Egg-Carriers, of which the following is a specification.

This invention relates to egg carriers.

Its object is convenience, simplicity and cheapness.

Figure 1:
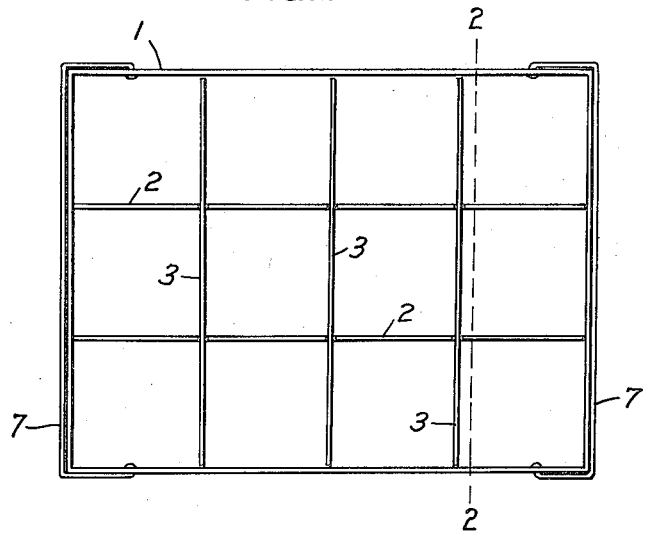
Figure 2:
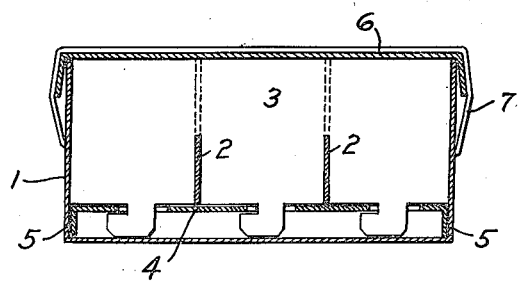
Figure 3:
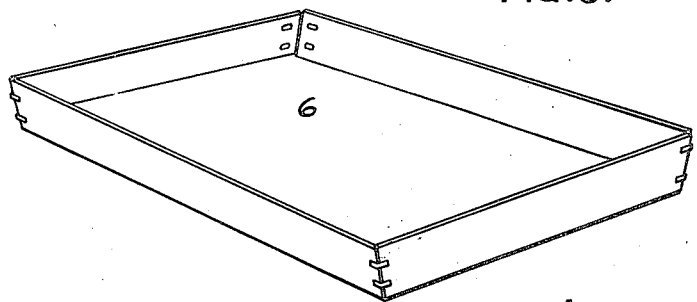

In the drawings:—Figure 1 is a top view of the container with the cover removed; Fig. 2 is a section on the line 2, 2 of Fig. 1; and Fig. 3 is a part that has the double function of lid and tray.

The container proper, indicated by 1, is a box, preferably of card board, or some other cheap material, that is divided by partitions into pockets for the eggs. The partitioning of the box is accomplished by a frame work that is independent of the box itself, and, furthermore, which is supported upon a cushion-like base, from which it can be removed in sections and with which it is placed within and taken out from the box 1.

The partitions are made preferably of cardboard, or other cheap, light material. The strips running in one direction, like 2, are slit down from their upper edges part of their widths, at intervals, while the strips 3 that cross the strips 2 are slit up from their lower edges, so that they interlock with the latter in the usual manner.

The novelty of the carrier is found in the provision for cushioning the eggs, and assembling the parts. The cushioning effect is procured by a false bottom 4 of cardboard, or other flexible material, that is supported above the bottom of the box by its downturned edges 5, and also by the feet 6 that project down from the partitions 3, between the cross partitions 2, as shown in Fig. 2, which so interlock with the false bottom 4 that they extend under it and support it (Fig. 2) at intervals, as upon shelves.

The lid or cover 6 is preferably made deep so that it serves as a tray to receive the eggs when the box is turned upside down. Accordingly the eggs can be carried to the house of the purchaser in the box where they are protected from being broken, and at the house turned out into the cover 6 and delivered in it, the cover, shown in Fig. 3, being comparatively inexpensive. During transportation of the eggs the cover 6 is secured upon the box by an elastic band 7.

What I claim is:—

An egg tray having, in combination, partitions, each partition having downward projections and each projection having a lug extending horizontally in the plane of the partition, a false bottom provided with straight slots of a length sufficient to receive said projections and lugs, and a box inclosing the partitions and the false bottom, the slots and lugs being so located as to cause the lugs to interlock with the false bottom beyond the ends of the slots when the parts are held in normal relative position by the box, so as to serve both as retainers for the partitions and as supports for the false bottom.

PETER J. NAGLE.

Witnesses:
C. W. CARROLL,
D. GURNEE.